United States Patent
Zhang et al.

(10) Patent No.: US 9,906,140 B2
(45) Date of Patent: Feb. 27, 2018

(54) POWER SUPPLY CIRCUIT AND POWER SUPPLY METHOD FOR SWITCHING POWER SUPPLY

(71) Applicant: Silergy Semiconductor Technology (Hangzhou) LTD, Hangzhou, ZheJiang Province (CN)

(72) Inventors: Shaobin Zhang, Hangzhou (CN); Zhiliang Hu, Hangzhou (CN); Yongjiang Bai, Hangzhou (CN); Jin Jin, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 1 day.

(21) Appl. No.: 15/148,220

(22) Filed: May 6, 2016

(65) Prior Publication Data
US 2016/0344294 A1 Nov. 24, 2016

(30) Foreign Application Priority Data
May 19, 2015 (CN) .......................... 2015 1 0255578

(51) Int. Cl.
*H02M 3/335* (2006.01)
*H02M 1/36* (2007.01)

(52) U.S. Cl.
CPC ......... *H02M 3/33507* (2013.01); *H02M 1/36* (2013.01)

(58) Field of Classification Search
CPC ............. H02M 3/335; H02M 3/33569; H02M 3/33507; H02M 3/33515; H02M 3/33523; H02M 3/3155; H02M 3/326; H02M 1/32

USPC .. 363/20, 21.01, 21.12, 21.13, 21.15, 21.18, 363/56.01, 131
See application file for complete search history.

(56) References Cited

U.S. PATENT DOCUMENTS

| | | | |
|---|---|---|---|
| 8,008,898 B2 * | 8/2011 | Melanson | H02M 3/156 323/222 |
| 9,054,592 B2 | 6/2015 | Yao et al. | |
| 9,246,394 B2 | 1/2016 | Deng | |
| 2007/0070659 A1 * | 3/2007 | Sawtell | H02M 3/33523 363/21.01 |
| 2013/0301309 A1 | 11/2013 | Chen | |
| 2015/0022163 A1 | 1/2015 | Han et al. | |
| 2015/0035505 A1 * | 2/2015 | Peluso | G05F 1/575 323/273 |

FOREIGN PATENT DOCUMENTS

CN 103929055 A 7/2014

* cited by examiner

*Primary Examiner* — Adolf Berhane
(74) *Attorney, Agent, or Firm* — Michael C. Stephens, Jr.

(57) ABSTRACT

A power supply circuit for a switching power supply including a power switch configured to receive a DC input voltage, can include: a switching control circuit configured to receive a charge voltage signal of a charge capacitor, a reference voltage signal, and a PWM control signal, and to generate a switching control signal; a control unit having a supply voltage from the charge capacitor, where the charge capacitor includes a first terminal coupled to the switching control circuit, and a second terminal coupled to ground; and where when the switching power supply is in a start-up phase, the power switch is turned on, the first switch is turned off, and the DC input voltage charge the charges capacitor through the power switch, and the control unit begins operating when the charge voltage signal reaches a level of starting voltage of the control unit.

13 Claims, 7 Drawing Sheets

POWER SUPPLY CIRCUIT AND POWER SUPPLY METHOD FOR SWITCHING POWER SUPPLY

RELATED APPLICATIONS

This application claims the benefit of Chinese Patent Application No. 201510255578.6, filed on May 19, 2015, which is incorporated herein by reference in its entirety.

FIELD OF THE INVENTION

The present invention generally relates to the field of power supplies, and more particularly to power supply circuits and methods of operating a switching power supply.

BACKGROUND

In a switching power supply, a main power switch is usually an N-channel enhancement transistor, and a high voltage starting resistor or other starting resistance is used to supply power for a control unit when starting (e.g., powering up) the circuit. In addition, an auxiliary winding of a transformer or an output terminal may be used to supply power for the control unit after the circuit is in normal operation state after the circuit is actuated.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
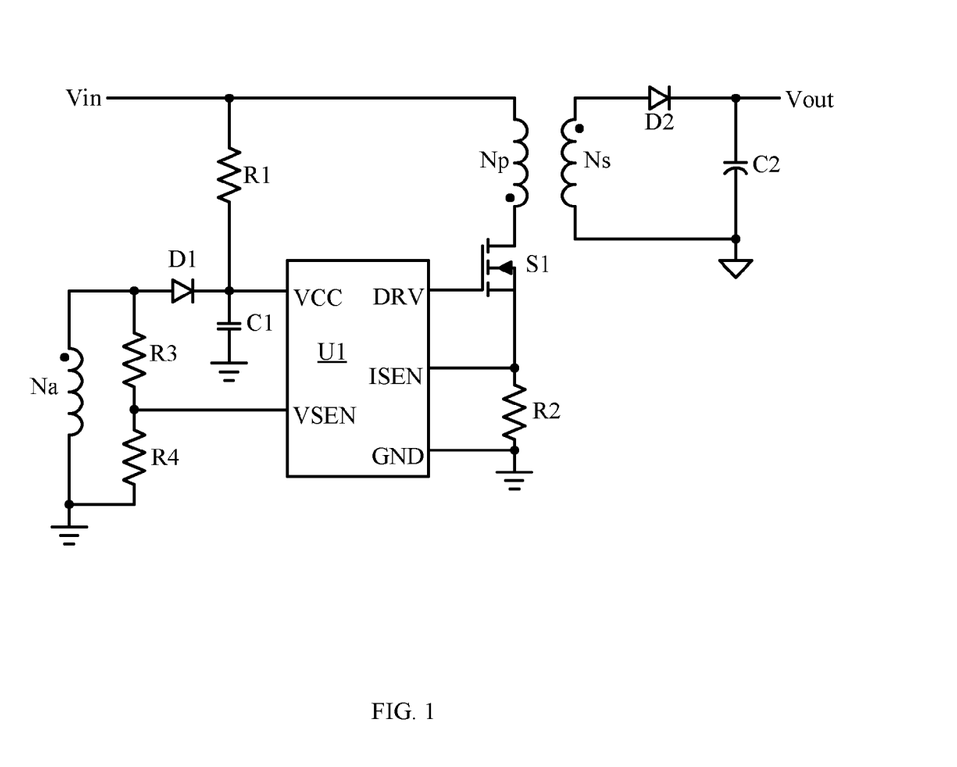
FIG. 1 is a schematic block diagram of a first example power supply for a primary-controlled flyback switching power supply.

Referring now to FIG. 1, shown is a schematic block diagram of a first example power supply for a primary-controlled flyback switching power supply. In this particular example, the flyback converter can include primary-side control unit U1 and main power switch S1 (e.g., a N-channel enhancement transistor). The flyback converter can also include high voltage starting resistor R1 that receives input voltage Vin for supplying power to control unit U1 when starting the circuit. Also, power supply diode D1 can supply power to control unit U1 together with auxiliary winding Na, and voltage dividing resistors R3 and R4, when in a normal operation state (e.g., powered up). However, though this type of circuit can be easy controlled, power losses on the high voltage starting resistor may be relatively large when in a no-load state.

Figure 2:
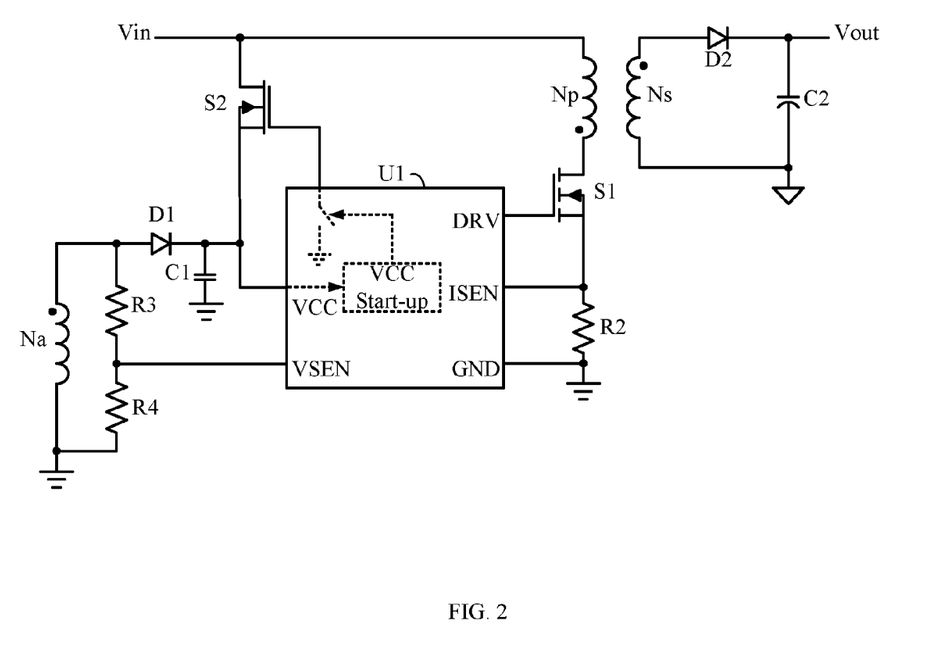
FIG. 2 is a schematic block diagram of a second example power supply for a primary-controlled flyback switching power supply.

Referring now to FIG. 2, shown is a schematic block diagram of a second example power supply for a primary-controlled flyback switching power supply. In this example, the high voltage starting resistor can be replaced by a depletion transistor, such as transistor S2 (e.g., a N-channel high voltage depletion transistor). When starting (e.g., powering up) the circuit, transistor S2 can be used to supply power to control unit U1. After the circuit is actuated (e.g., powered up), the gate of transistor S2 can be pulled down to a low level, so as to turn off transistor S2, such that auxiliary winding Na, voltage dividing resistors R3 and R4, and diode D1 may supply power to the control unit. This approach can solve the problem of high power losses in the no-load state; however, high voltage transistor S2 can increase overall product costs.

Figure 3:
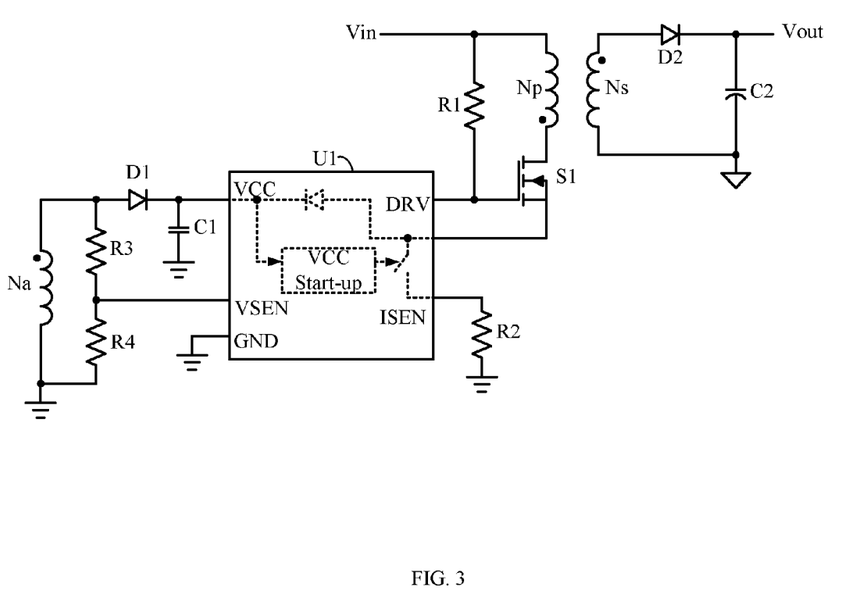
FIG. 3 is a schematic block diagram of a third example power supply for a primary-controlled flyback switching power supply.

Referring now to FIG. 3, shown is a schematic block diagram of a third example power supply for a primary-controlled flyback switching power supply. In this example, resistor R1 has one terminal connected to input voltage Vin, and the other terminal connected to the gate of main power switch S1. When starting the circuit, resistor R1 can supply power to the gate of power switch S1 for turning on power switch S1. In such case, the source of the power switch S1 may effectively be disconnected from sampling resistor R2, and the input voltage can be supplied to the control unit through primary winding Np of the transformer and power switch S1.

After the circuit is actuated (e.g., powered up), the source of the power switch can effectively be connected to sampling resistor R2. In such case, auxiliary winding Na, voltage dividing resistors R3 and R4, and diode D1 can supply power to control unit U1. Thus, in this circuit, resistor R1 can be used to supply power to power switch S1, and the value of resistor R1 may be much larger than high voltage starting resistor R1 in the example of FIG. 1. Thus, the problem of high power losses in the no-load state may be solved with this approach, and no additional high voltage transistors may be needed, such as in the arrangement of FIG. 2. However, many peripheral components of the controller may still be utilized in this approach since resistor R1 is used for supplying power to power switch S1 in the start-up phase, and diode D1 is used for supplying power to the control unit after the circuit is actuated.

In one embodiment, a power supply circuit for a switching power supply including a power switch configured to receive a DC input voltage, can include: (i) a switching control circuit with a first switch coupled with the power switch in series, where the power switch includes a depletion transistor, and the first switch includes an enhancement transistor; (ii) the switching control circuit being configured to receive a charge voltage signal of a charge capacitor, a reference voltage signal, and a PWM control signal, and to generate a switching control signal for controlling switching operations of the power switch and the first switch; (iii) a control unit having a supply voltage from the charge capacitor, where the charge capacitor includes a first terminal coupled to the switching control circuit, and a second terminal coupled to ground; (iv) where when the switching power supply is in a start-up phase, the power switch is turned on, the first switch is turned off, the DC input voltage is configured to charge the charge capacitor through the power switch, and the control unit operating when the charge voltage signal reaches a level of starting voltage of the control unit; and (v) where when the switching power supply is in a normal operation phase, the switching control signal is configured to control switching operations of the power switch and the first switch such that the charge voltage signal of the charge capacitor is maintained at a predetermined operating voltage of the control unit.

Figure 4:
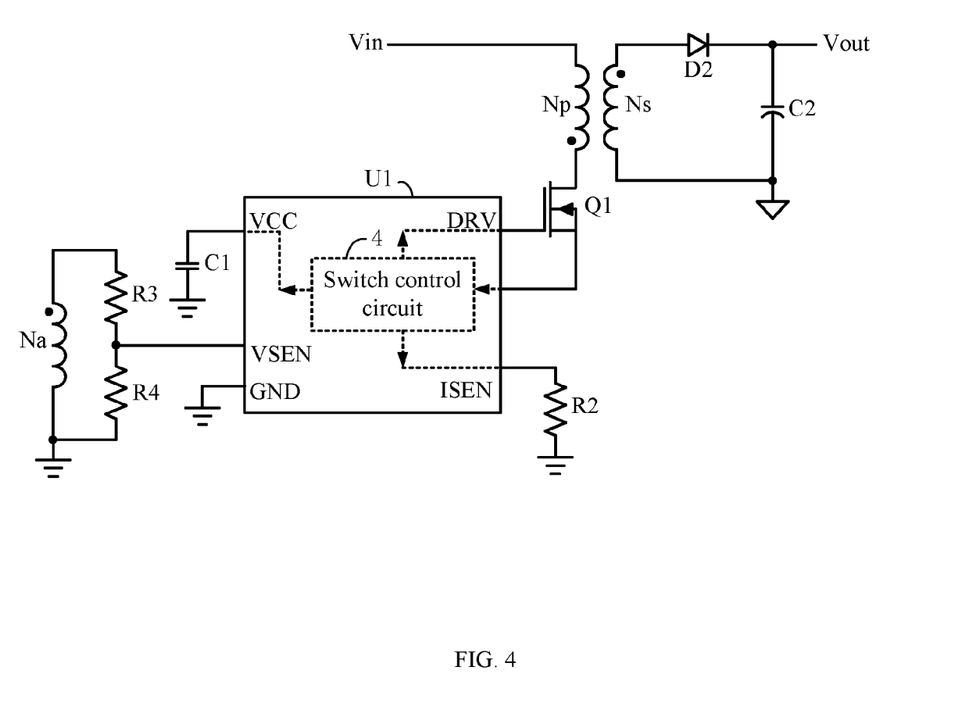
FIG. 4 is a schematic block diagram of an example power supply circuit of a switching power supply, in accordance with embodiments of the present invention.

Referring now to FIG. 4, shown is a schematic block diagram of an example power supply circuit of a switching power supply, in accordance with embodiments of the present invention. This example switching power supply (e.g., a flyback switching power supply) can include a rectifier bridge (not shown), an inductive element (e.g., transformer) including primary winding Np and secondary winding Ns, and power switch Q1 (e.g., a depletion transistor). The rectifier bridge can generate DC input voltage Vin by rectifying an external input voltage. The power supply circuit can include switch control circuit 4, and charge capacitor C1 with one terminal connected to switch control circuit 4 and the other terminal connected to ground. Charge capacitor C1 can provide supply voltage VCC to control unit U1 of the switching power supply. The switching power supply can also include sampling resistor R1, and an output signal feedback circuit that includes auxiliary winding Na and voltage dividing resistors R3 and R4.

Figure 5:
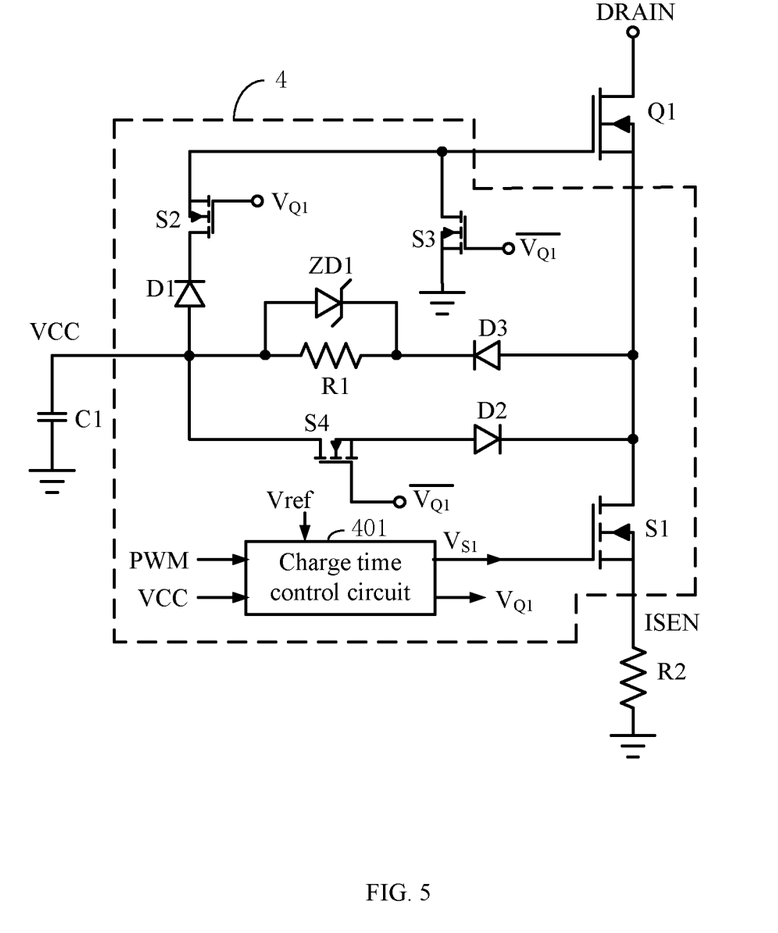
FIG. 5 is a schematic block diagram of an example switch control circuit, in accordance with embodiments of the present invention.

Referring now to FIG. 5, shown is a schematic block diagram of an example switch control circuit, in accordance with embodiments of the present invention. In this example, switch control circuit 4 can include switch S1 (e.g., an enhancement transistor) connected in series with the power switch. Switch control circuit 4 can receive charge voltage signal VCC of the charge capacitor, reference voltage signal Vref, and pulse-width modulation (PWM) control signal PWM, and may generate switching control signals including power switch control signal $V_{Q1}$ and switch control signal $V_{S1}$ to respectively control switching operations of power switch Q1 and switch S1. In this particular example, switch control circuit 4 can include charge time control circuit 401 for receiving charge voltage signal VCC, reference voltage signal Vref, and the PWM control signal, and for generating power switch control signal $V_{Q1}$ and switch control signal $V_{S1}$. For example, the reference voltage signal may be a fixed value, or an adjustable reference voltage value based on system parameters to represent a predetermined operating voltage of the control unit. Also, PWM control signal can be consistent with (e.g., same frequency as) the switching cycle of the system.

When the circuit is in the beginning of start-up (e.g., power up), power switch Q1 can be turned on since it is a depletion transistor. Also, switch S1 may be turned off, and DC input voltage Vin can charge capacitor C1 through power switch Q1. Thus, the charge voltage across the charge capacitor can increase. When charge voltage signal VCC increases to the start-up voltage of control unit U1, control unit U1 can begin operating or working. As described herein, "operating" or "working" as to control unit U1 can indicate when control unit U1 has a sufficient VCC level in order to be functional for its intended purpose, such as generate a driving control signal for power switch Q1. When the circuit enters a normal operating state, the switching control signal(s) can control the switching operation of power switch Q1 and switch S1, in order to maintain charge voltage signal VCC of the power supply capacitor at a predetermined operating voltage. In this example, the charge voltage signal can be charged to be slightly larger (or higher) than the predetermined operating voltage of the control unit, in order to protect the control unit to operate normally during abnormal conditions (e.g., sudden power off).

Power switch Q1 may not be fully conductive during the start-up phase, so the charge capacitor can mainly be charged by the leakage current flowing through power switch Q1. In certain embodiments, there may be no need for a traditional high voltage starting resistor and/or auxiliary winding by utilizing the above-described control mode. In this way, the power supply circuit can reduce the power losses and overall circuit product costs.

Switch control circuit 4 also can include a clamping circuit that includes switch S2 and diode D1. For example, switch S2 and diode D1 can be connected in series between a control terminal of power switch Q1 and a first terminal of charge capacitor C1. The anode of diode D1 can connect to the first terminal of charge capacitor C1, and the cathode of diode D1 can connect to switch S2. Switch S2 can be controlled by switching control signal $V_{Q1}$. In addition, switch control circuit 4 can include another clamping circuit that includes switch S3. For example, switch S3 can connect between the control terminal of power switch Q1 and ground. Also, the switching state of switch S3 may be opposite to that of switch S2, and may be controlled by switching control signal $V_{Q1}$.

Moreover, switch control circuit 4 can include yet another clamping circuit that includes diode D2 and switch S4. For example, diode D2 and switch S4 can be connected between the source of power switch Q1 and the first terminal of the charge capacitor. Also, the anode of diode D2 can connect to switch S4, and the cathode of diode D2 can connect to the source of power switch Q1. The switching state of switch S4 can be opposite to that of switch S2, and may be controlled by switching control signal $V_{Q1}$. Furthermore, switch control circuit 4 can include an energy transmission circuit that includes diode D3 and resistor R1. For example, diode D3 and resistor R1 can connect between the source of the power switch and the first terminal of the charge capacitor. The anode of diode D3 can connect to the source of the power switch, and the cathode of diode D3 can connect to resistor R1. In this example, the energy transmission circuit can also include zener diode ZD1 connected in parallel with resistor R1. The anode of zener diode ZD1 can connect to the first terminal of the charge capacitor and the cathode of zener diode ZD1 can connect to the cathode of diode D3. The zener diode can be used to clamp the maximal voltage of resistor R1, in order to clamp the drain voltage of switch S1 to ensure safe operation of switch S1.

The switching operation of power switch Q1 can be controlled by switches S2 and S3, such that power switch Q1 may be indirectly controlled by power switching control signal $V_{Q1}$. When starting or powering up the circuit, power switch Q1 can be turned on, switch S1 can be turned off, switch S2 can be turned on, and switches S3 and S4 can be turned off. DC input voltage Vin may be used to charge capacitor C1 through diode D3 and resistor R1. The charge voltage signal of the charge capacitor can increase, and the gate voltage of power switch Q1 may be clamped at charge voltage signal VCC due to the function of switch S2 and diode D1.

When the gate-source voltage of power switch Q1 is smaller than (or less than) a threshold ON voltage because of the increase of the source voltage of power switch Q1, power switch Q1 can be turned off. With the decreasing of charge voltage signal VCC, the source voltage of power switch Q1 may be pulled down. When the gate-source voltage of power switch Q1 is larger than or greater than the threshold ON voltage because of the decrease of the source voltage of power switch Q1, power switch Q1 can again be turned on again, and the DC input voltage may charge capacitor C1. In this way, the gate-source voltage of power switch Q1 can be substantially maintained at the threshold ON voltage during the start-up phase, and the control unit can begin operating when the charge voltage signal reaches the starting voltage of the control unit. Then, the system may complete a start-up phase and enter a normal operation phase.

Charge time control circuit 401 can control the switching states of the power switch and switch S1 according to charge voltage signal VCC, reference voltage signal Vref, and the PWM control signal during the normal operation phase, to control charge voltage signal VCC. Charge time control circuit 401 can be any suitable circuit structure, and may include a comparator, a single pulse circuit, and/or a logic circuit.

In one embodiment, a method of controlling a power supply for a switching power supply having a power switch configured to receive a DC input voltage, where the power switch a depletion transistor, can include: (i) when the switching power supply is in a start-up phase, turning on the power switch, charging by the DC input voltage a charge capacitor through the power switch, the charge capacitor providing a supply voltage for a control unit of the switching power supply, and the control unit operating when the charge voltage signal reaches a starting voltage of the control unit; and (ii) when the switching power supply is in a normal operation phase, controlling switching operations of the power switch and the first switch to maintain the charge voltage signal of the charge capacitor at a predetermined operating voltage of the control unit, where the first switch is coupled in series with the power switch.

Figure 6:
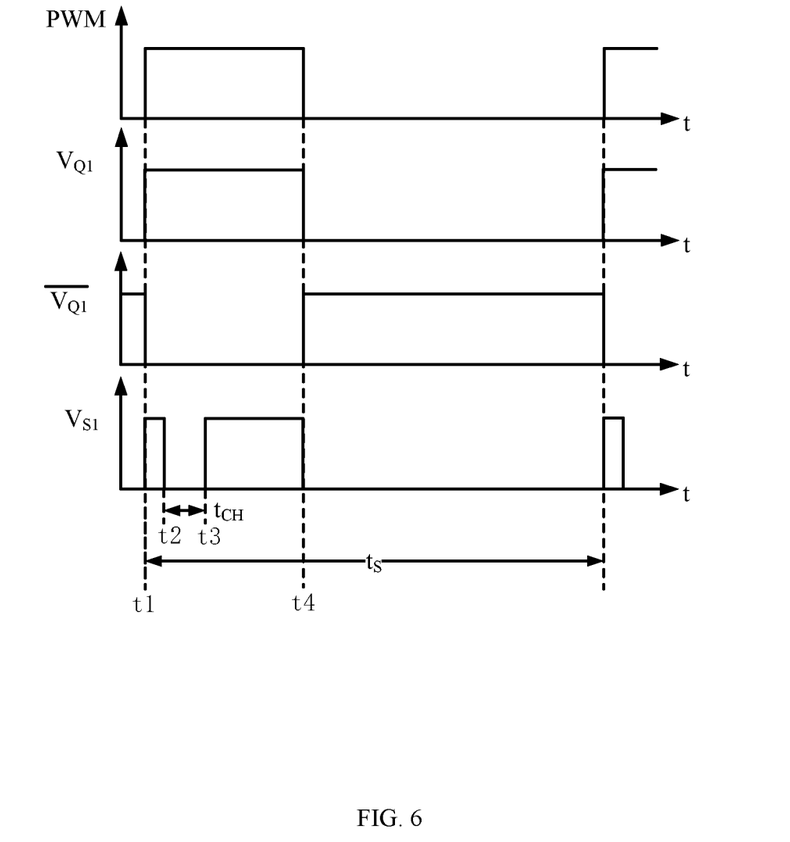
FIG. 6 is a waveform diagram of a first example operation of a charge time control circuit used for charging a charge capacitor, in accordance with embodiments of the present invention.

Referring now to FIG. 6, shown is a waveform diagram of a first example operation of a charge time control circuit used for charging a charge capacitor, in accordance with embodiments of the present invention. In one switching cycle, when the PWM control signal goes high at time t1, power switch control signal $V_{Q1}$ can turn on power switch Q1. Also, switch control signal $V_{S1}$ can go high and switch S1 can be turned on. After a first time period, if charge voltage signal VCC is determined to be greater than reference voltage signal Vref at time t2, switch control signal $V_{S1}$ can keep switch S1 on. If charge voltage signal VCC is determined to be less than reference voltage signal Vref at time t2, switch control signal $V_{S1}$ can turn switch S1 off. The DC input voltage can charge capacitor C1 through power switch Q1. When charge voltage signal VCC reaches the level of reference voltage signal Vref, switch control signal $V_{S1}$ can control switch S1 to be turned on. In this example, a logic high level can indicate an active state, and a logic low level can indicate an inactive state. As shown, is can indicate one switching cycle in FIG. 6, and a next switching cycle may begin when the PWM control signal again goes high in order to repeat the operation.

In another implementation, if charge voltage signal VCC is determined to be less than reference voltage signal Vref, switch control signal $V_{S1}$ can control switch S1 to be turned off. The DC input voltage can charge capacitor C1 through power switch Q1. When the charge time for charging the charge capacitor by the DC input voltage through power switch Q1 reaches a maximum fixed charge time, switch S1 can be turned on. When the reference voltage signal is set to be relatively large, the charge voltage signal may not be able to reach the reference voltage signal even though the charge capacitor has been charging for a relatively long time. In such a case, the charge capacitor can be charged according to the maximum fixed charge time. If the charge voltage signal does not reach the predetermined operation voltage during the maximum fixed charge time, the charge capacitor can be charged by turning on the power switch and turning off switch S1 after this operation period has ended, but prior to the next operation period.

Those skilled in the art will recognize that, during the above described charge process, when the reference voltage signal is relatively high, in one switching cycle, the charge time may be set according to charge voltage signal VCC. For example, the charge time can be shorter when charge voltage signal VCC is larger, and the charge time may be longer when charge voltage signal VCC is smaller, so long as the charge voltage signal reaches the predetermined operating voltage of the control unit.

In this example, power switch Q1 and switch S1 may both be simultaneously turned on prior to charging capacitor C1. This is because the gate-source voltage of power switch Q1 can be maintained around the threshold ON voltage during the start-up phase. The power losses may be relatively large and the charge current can be limited to lower the charging speed if the charge process is started by turning on power switch Q1 directly, but not turning on switch S1. Thus, in this example, switch S1 can be turned on to keep the gate-source voltage of power switch Q1 be VCC. In this way, power switch Q1 may fully conduct during the subsequent charging process, so as to reduce charge losses and to improve the charging speed.

Figure 7:
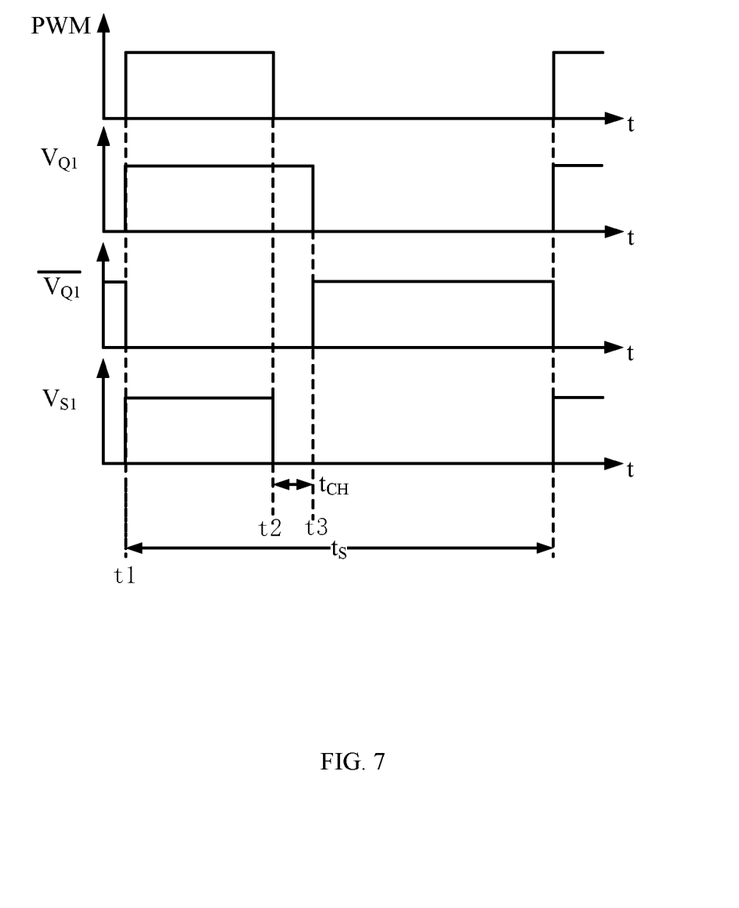
FIG. 7 is a waveform diagram of a second example operation of a charge time control circuit used for charging a charge capacitor, in accordance with embodiments of the present invention.

Referring now to FIG. 7, shown is a waveform diagram of a second example operation of a charge time control circuit used for charging a charge capacitor, in accordance with embodiments of the present invention. Here, in one switching cycle, when the PWM control signal goes high at time t1, and power switch control signal $V_{Q1}$ may also go high to turn on power switch Q1. Also, switch control signal $V_{S1}$ turns to be high level, switch S1 can be turned on. At time t2, the PWM control signal may go low, and switch control signal $V_{S1}$ can control switch S1 to be turned off. In such a case, if charge voltage signal VCC is determined to be greater than reference voltage signal Vref, power switch control signal $V_{Q1}$ can control power switch Q1 to be turned off. Power switch control signal $V_{Q1}$ can maintain power switch Q1 as on, and DC input voltage Vin can charge capacitor C1 through power switch Q1. When charge voltage signal VCC reaches a level of reference voltage signal Vref, power switch control signal $V_{Q1}$ can turn off power switch Q1. One switching cycle can be indicated as $t_S$, and a next switching cycle may begin when the PWM control signal again goes high in order to repeat the operation.

If charge voltage signal VCC is determined to be less than reference voltage signal Vref, power switch control signal $V_{Q1}$ can control power switch Q1 to be turned on. DC input voltage Vin can charge capacitor C1 through power switch Q1. When the charge time for charging the charge capacitor by the DC input voltage through the power switch reaches a maximum fixed charge time, power switch Q1 may be turned off. Also, when the reference voltage signal is set to be relatively large, the charge voltage signal may not be able to reach the reference voltage signal even though the charge capacitor has been charged for a very long time. In such a case, the charge capacitor can be charged according to the maximum fixed charge time. If the charge voltage signal does not reach the predetermined operation voltage during the maximum fixed charge time, the charge capacitor maybe charged by turning on the power switch and turning off switch S1 after this operation period has completed, but prior to beginning the next operation period.

In this way, the charge voltage signal can be monitored and controlled in each switching cycle such that the power switch may be turned on and switch S1 may be turned off when the charge voltage signal is detected to be less than a predetermined reference voltage signal, in order to charge the charge capacitor, and achieve a self-powered supply during the operation.

Also in particular embodiments, a power supply control method for a switching power supply that includes a power switch and a depletion transistor for receiving a DC input voltage, can include when the circuit is in the start-up phase, turning on the power switch. The DC input voltage can charge a capacitor (e.g., C1) through a power switch (e.g., Q1). The charge capacitor may provide a supply voltage to a control unit (e.g., U1) of the switching power supply, and the control unit can begin operating when the charge voltage signal reaches the starting voltage of the control unit of the switching power supply.

When the circuit is in the normal operation phase, the switching operation of the power switch and switch S1 can be controlled to maintain the charge voltage signal of the charge capacitor as a predetermined operating voltage of the control unit. For example, the power switch and switch S1 can be connected in series. In addition, when the circuit is in the normal operation phase, the switching operation of the power switch and switch S1 may be controlled in each switching cycle according to the charge voltage signal of the charge capacitor, a reference voltage signal (e.g., Vref) and a PWM control signal.

In one switching cycle, when the PWM control signal is activated, the power switch and switch S1 can be controlled to be turned on. Then after a first time period, if the charge voltage signal is determined to be greater than the reference voltage signal, switch S1 can remain on. If the charge voltage signal is determined to be less than the reference voltage signal, switch S1 can be controlled to be turned off. The DC input voltage can charge the charge capacitor through the power switch, and when the charge voltage signal reaches a level of the reference voltage signal, switch S1 can be turned on. Or, when the charge time of charging the charge capacitor by the DC input voltage through the power switch reaches a maximum fixed charge time, switch S1 can be controlled to be turned on.

When the PWM control signal goes inactive, the power switch and switch S1 can be turned off. In addition, when the circuit is in the normal operation phase, the switching operation of the power switch and switch S1 can be controlled in each switching cycle according to the charge voltage signal of the charge capacitor, a reference voltage signal, and a PWM control signal. In one switching cycle, when the PWM control signal goes active, the power switch and switch S1 can be controlled to be turned on.

When the PWM control signal goes inactive, switch S1 can be controlled to be turned off. If the charge voltage signal is determined to be greater than the reference voltage signal, the power switch can be turned off. If the charge voltage signal is determined to be less than the reference voltage signal, the power switch may remain on. The DC input voltage can charge the charge capacitor through the power switch. When the charge voltage signal reaches a level of the reference voltage signal, the power switch can be turned off, or when the charge time of charging the charge capacitor by the DC input voltage through the power switch reaches a maximum fixed charge time, switch S1 can be controlled to be turned off.

Certain embodiments can provide power supply circuits and methods of operating a switching power supply. In a switching power supply, the power switch can be a depletion transistor, and since the depletion transistor has the characteristic of being turned on when its gate voltage is zero, when the circuit is in the start-up phase, the DC input voltage can charge the charge capacitor through the power switch such that the voltage across the charge capacitor rises to the operating voltage of the control unit. When the circuit is in normal operation, the switch control circuit can control the switching operation of the power switch and switch S1 such that the charge voltage signal of the charge capacitor is maintained at the predetermined operating voltage of the control unit. In this way, there may be no need for a high voltage starting resistor such that power losses can be significantly reduced, and a power supply can be provided without certain components, such as an auxiliary winding, and a diode, in order to simplify the peripheral circuitry and reduce associated product costs.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power supply circuit for a switching power supply comprising a power switch configured to receive a DC input voltage, the power supply circuit comprising:
    a) a switching control circuit comprising a first switch coupled with said power switch in series, wherein said power switch comprises a depletion transistor, and said first switch comprises an enhancement transistor;
    b) said switching control circuit being configured to receive a charge voltage signal of a charge capacitor, a reference voltage signal, and a PWM control signal, and to generate a switching control signal for controlling switching operations of said power switch and said first switch;
    c) a control unit having a supply voltage from said charge capacitor, wherein said charge capacitor comprises a first terminal coupled to said switching control circuit, and a second terminal coupled to ground;
    d) wherein when said switching power supply is in a start-up phase, said power switch is turned on due to said depletion transistor, said first switch is turned off, said DC input voltage is configured to charge said charge capacitor through said power switch, and said control unit operating when said charge voltage signal reaches a level of a starting voltage of said control unit; and
    e) wherein when said switching power supply is in a normal operation phase, said switching control signal is configured to control switching operations of said power switch and said first switch such that said charge voltage signal of said charge capacitor is maintained at a predetermined operating voltage of said control unit.

2. The power supply circuit of claim 1, wherein said switching control circuit comprises:
   a) a charge time control circuit configured to receive said charge voltage signal, said reference voltage signal, and said PWM control signal, and to generate said switching control signal including a power switch control signal and a first switching control signal;
   b) wherein in one switching cycle, when said PWM control signal turns is activated, said power switch control signal is configured to turn on said power switch, and said first switch control signal is configured to turn on said first switch, wherein after a first time period, if said charge voltage signal is determined to be greater than said reference voltage signal, said first switch control signal is configured to keep said first switch on;
   c) wherein if said charge voltage signal is less than said reference voltage signal, said first switch control signal configured to turn off said first switch, and said DC input voltage is configured to charge said charge capacitor through said power switch; and
   d) wherein when said PWM control signal is deactivated, said power switch control signal is configured to turn off said power switch, and said first switch control signal is configured to turn off said first switch.

3. The power supply circuit of claim 2, further comprising:
   a) said first switch control signal is configured to turn on said first switch when said charge voltage signal reaches a level of said reference voltage signal; and
   b) said first switch control signal is configured to turn on said first switch when the charge time of charging said charge capacitor by said DC input voltage through said power switch reaches a maximum fixed charge time.

4. The power supply circuit of claim 1, wherein said switching control circuit comprises:
   a) a charge time control circuit configured to receive said charge voltage signal, said reference voltage signal, and said PWM control signal, and to generate said switching control signal, wherein said switching control signal comprises a power switch control signal and a first switching control signal;
   b) wherein in one switching cycle, when said PWM control signal is activated, said power switch control signal is configured to turn on said power switch, and said first switch control signal is configured to turn on said first switch;
   c) wherein when said PWM control signal turns is deactivated, said first switch control signal is configured to turn off said first switch, and wherein if said charge voltage signal is greater than said reference voltage signal, said power switch control signal is configured to turn off said power switch; and
   d) wherein if said charge voltage signal is less than said reference voltage signal, said power switch control signal is configured to maintain said power switch as on, and said DC input voltage is configured to charge said charge capacitor through said power switch.

5. The power supply circuit of claim 4, further comprising:
   a) said power switch control signal is configured to turn off said power switch when said charge voltage signal reaches a level of said reference voltage signal; and
   b) said power switch control signal is configured to turn off said power switch when the charge time of charging said charge capacitor by said DC input voltage through said power switch reaches a maximum fixed charge time.

6. The power supply circuit of claim 2, wherein said switching control circuit further comprises:
   a) a first clamping circuit coupled between a control terminal of said power switch and a first terminal of said charge capacitor, wherein said first clamping circuit is configured to clamp a voltage at said control terminal of said power switch at said charge voltage signal when said power switch is turned on;
   b) a second clamping circuit coupled between said control terminal of said power switch and ground, wherein said second clamping circuit is configured to clamp said voltage at said control terminal of said power switch at zero when said power switch is turned off;
   c) a third clamping circuit coupled between a source of said power switch and said first terminal of said charge capacitor, wherein said third clamping circuit clamps the source voltage of said power switch at said charge voltage signal when said power switch is turned off; and
   d) an energy transmission circuit coupled between said source of said power switch and said first terminal of said charge capacitor, wherein said DC input voltage is configured to charge said charge capacitor through said energy transmission circuit when said power switch is on and said first switch is off.

7. The power supply circuit of claim 6, wherein:
   a) said first clamping circuit comprises a second switch and a first diode that coupled between said control terminal of said power switch and said first terminal of said charge capacitor, wherein said first diode comprises an anode coupled to said first terminal of said first diode, and a cathode coupled to said second switch, wherein said second switch is controlled by said power switch control signal;
   b) said second clamping circuit comprising a third switch being coupled between said control terminal of said power switch and ground, wherein a switching state of said third switch is opposite to a switching state of said second switch;
   c) said third clamping circuit comprises a second diode and a fourth switch that are coupled between a source of said power switch and said first terminal of said charge capacitor, wherein said second diode comprises an anode coupled to said fourth switch, and a cathode being coupled to said source of said power switch, and wherein a switching state of said fourth switch is opposite to a switching state of said second switch; and
   d) said energy transmission circuit comprises a third diode and a first resistor coupled between said source of said power switch and said first terminal of said charge capacitor, wherein said third diode comprises an anode being coupled to said source of said power switch, and a cathode coupled to one terminal of said first resistor.

8. The power supply circuit of claim 7, wherein said energy transmission circuit further comprises a zener diode coupled with said first resistor, wherein said zener diode comprises an anode being coupled to said first terminal of said charge capacitor, and a cathode coupled to said cathode of said third diode.

9. A method of controlling a power supply for a switching power supply having a power switch configured to receive a DC input voltage, and a first switch coupled in series with said power switch, wherein said power switch comprises a depletion transistor, and said first switch comprises an enhancement transistor, the method comprising:
- a) when said switching power supply is in a start-up phase, turning on said power switch due to said depletion transistor, charging by said DC input voltage a charge capacitor through said power switch, said charge capacitor providing a supply voltage for a control unit of said switching power supply, and said control unit operating when said charge voltage signal reaches a starting voltage of said control unit; and
- b) when said switching power supply is in a normal operation phase, controlling switching operations of said power switch and said first switch to maintain said charge voltage signal of said charge capacitor at a predetermined operating voltage of said control unit, wherein said first switch is coupled in series with said power switch.

10. The method of claim 9, further comprising:
- a) in one switching cycle, turning on said power switch and said first switch when said PWM control signal is activated;
- b) after a first time period has elapsed, maintaining said first switch signal and said power switch on if said charge voltage signal is determined to be greater than said reference voltage signal;
- c) turning off said first switch, and charging by said DC input voltage said charge capacitor through said power switch if said charge voltage signal is determined to be less than said reference voltage signal; and
- d) turning off said power switch and said first switch when said PWM control signal is deactivated.

11. The method of claim 10, further comprising:
- a) turning on said first switch when said charge voltage signal reaches a level of said reference voltage signal; and
- b) turning on said first switch when the charge time of charging said charge capacitor by said DC input voltage through said power switch reaches a maximum fixed charge time.

12. The method of claim 9, further comprising:
- a) in one switching cycle, turning on said power switch and said first switch when said PWM control signal is activated;
- b) turning off said first switch when said PWM control signal is deactivated;
- c) turning off said power switch if said charge voltage signal is determined to be greater than said reference voltage signal;
- d) charging, by said DC input voltage, said charge capacitor through said power switch if said charge voltage signal is determined to be less than said reference voltage signal, and keeping said power switch on; and
- e) said power switch is controlled to be turned off when said charge voltage signal reaches a level of said reference voltage signal.

13. The method of claim 12, further comprising:
- a) turning off said power switch when said charge voltage signal reaches a level of said reference voltage signal; and
- b) turning off said power switch when the charge time of charging said charge capacitor by said DC input voltage through said power switch reaches a maximum fixed charge time.

\* \* \* \* \*